United States Patent [19]
Bolkestein

[11] Patent Number: 5,497,698
[45] Date of Patent: Mar. 12, 1996

[54] DEVICE FOR STORING FRUIT, KEPT IN CONTAINERS PLACED ON A PALLET, UNDER CONTROLLED CONDITIONS

[75] Inventor: Cornelis Bolkestein, Rotterdam, Netherlands

[73] Assignee: Binair Groep b.v., Moerkapelle, Netherlands

[21] Appl. No.: 298,261

[22] Filed: Aug. 31, 1994

[30] Foreign Application Priority Data

Sep. 1, 1993 [NL] Netherlands ............................ 9301514

[51] Int. Cl.$^6$ ............................ A23B 7/148; A23B 7/152; A23L 1/00; A23L 3/00
[52] U.S. Cl. ................................. 99/476; 99/467; 99/474; 99/516
[58] Field of Search ............................. 99/467–476, 485, 99/477, 483, 480, 516, 536; 426/263, 418, 419

[56] References Cited

U.S. PATENT DOCUMENTS

| | | |
|---|---|---|
| 3,129,071 | 4/1964 | Meredith . |
| 3,683,788 | 8/1972 | McDonnell et al. ...................... 99/470 |
| 3,958,028 | 5/1976 | Burg ........................................ 426/418 |
| 4,676,152 | 6/1987 | Tsuji et al. ................................ 99/468 |
| 4,764,389 | 8/1988 | LaBarge .................................... 99/474 |
| 4,894,997 | 1/1990 | Urushizaki et al. ..................... 426/419 |
| 5,041,298 | 8/1991 | Wallace et al. ............................ 99/474 |
| 5,054,291 | 10/1991 | Davis et al. . |
| 5,318,789 | 6/1994 | Nakagawa ................................ 99/467 |

FOREIGN PATENT DOCUMENTS

| | | |
|---|---|---|
| 0438210 | 7/1991 | European Pat. Off. . |
| 2615071 | 11/1988 | France . |
| 724922 | 2/1955 | United Kingdom . |

OTHER PUBLICATIONS

By A. Helsen et al., "Natte koeling", Koeltechniek, Feb. 1988, vol. 81, No. 2, pp. 12–17.

*Primary Examiner*—Timothy F. Simone
*Attorney, Agent, or Firm*—Young & Thompson

[57] ABSTRACT

A device for storing fruit, such as bananas, kept in containers placed on a pallet, under controlled conditions. The device comprises a cabinet having an intake and an outlet for air, and a feed and an atomizer for liquid. The air outlet is formed by an essentially open planar front of the cabinet, the dimensions of the outlet essentially corresponding to those of a side of the load of fruit, placed in containers on a pallet, which is to be placed against the cabinet. The air intake opens into a chamber in which the atomizer is mounted. An air-penetrable filter separates this chamber from the outlet. The atomizer preferably comprises a spray tube which extends through the cabinet and has spray nozzles, a splash board being arranged close to the spray tube. The air is forcibly supplied, for example by means of a fan. Buffers for a pallet and guides for guiding the pallet to the front of the cabinet are fitted at the bottom of the cabinet at the front.

12 Claims, 1 Drawing Sheet

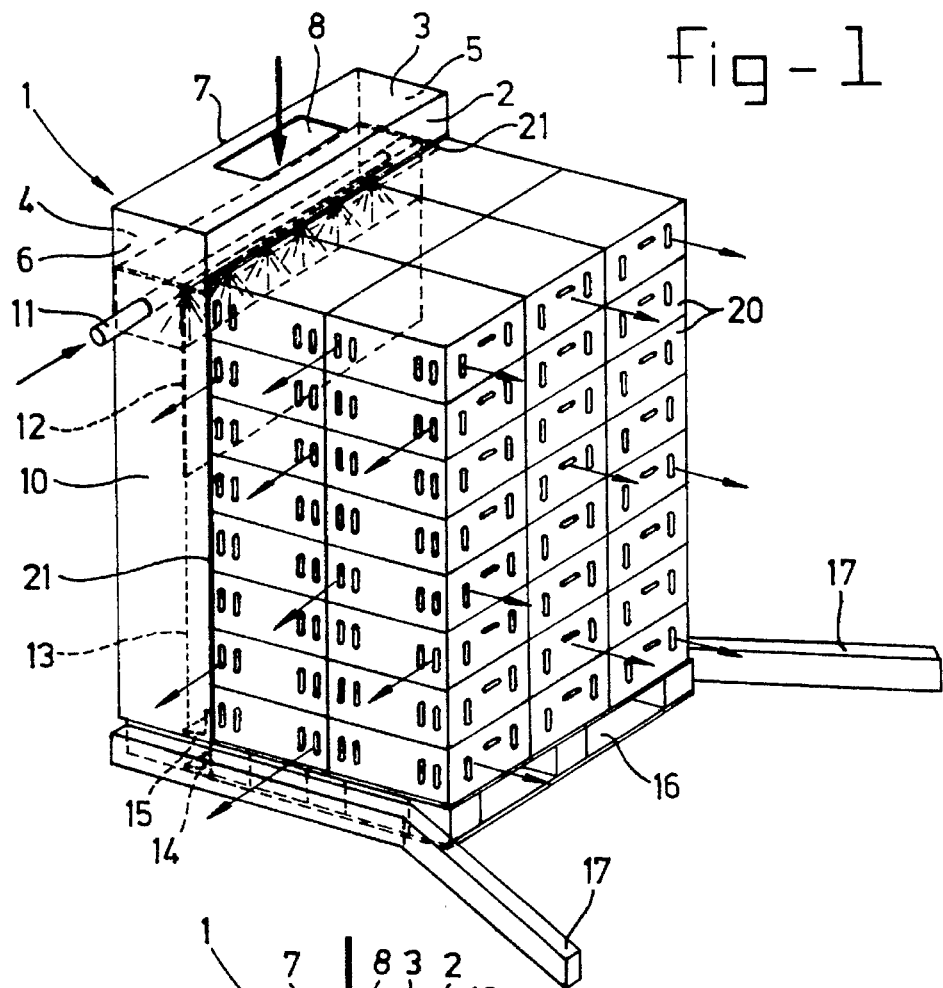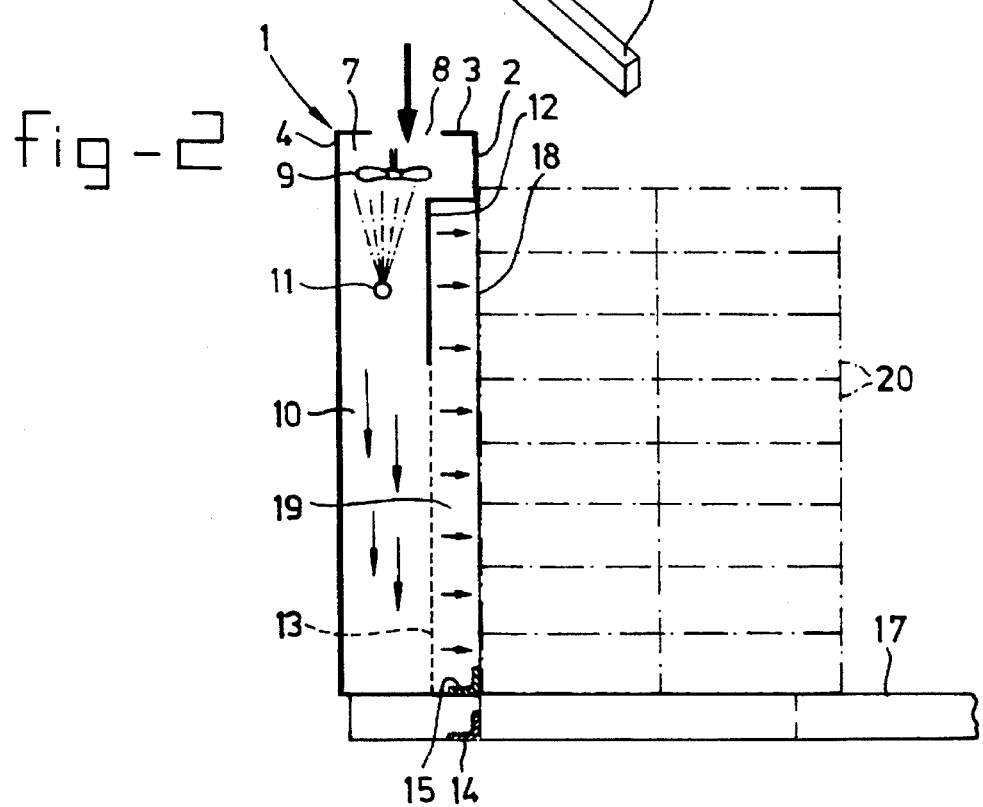

DEVICE FOR STORING FRUIT, KEPT IN CONTAINERS PLACED ON A PALLET, UNDER CONTROLLED CONDITIONS

The present invention relates to an device for storing fruit, such as bananas, kept in containers placed on a pallet, under controlled conditions, said device comprising a cabinet having an intake and an outlet for air, and feed and atomisation means for liquid.

Devices of this type are generally known. With these known devices, pallets stacked with containers containing fruit are stored in a closed air-conditioned chamber. With this arrangement the chamber is air-conditioned by controlling the humidity and/or the temperature in the chamber. Chambers of this type take up a great deal of space and are expensive. For these reasons, chambers of this type are rarely, if ever, used in shops and/or supermarkets to store the fruit under such conditions that ripening and/or rotting thereof is delayed.

The aim of the present invention is to provide a device for storing fruit under controlled conditions, which device in itself takes up little space and can be used in an ordinary open shed or warehouse to delay or counteract further ripening and decomposition or rotting of the fruit.

This aim is achieved according to the invention in that the air outlet is formed by an essentially open planar front of the cabinet, the dimensions of the outlet essentially corresponding to those of a side of the load of fruit, placed in containers on a pallet, which is to be placed against the cabinet, in that the air intake opens into a chamber in which atomisation means are mounted and in that an air-penetrable filter separates said chamber from the outlet.

With this arrangement the air is forcibly supplied to the cabinet, via and/or through the intake. To this end, the intake can, for example, be provided with a suction fan, but it is also possible for the intake to be connected to an outlet via an aeration system. A pallet loaded with containers containing fruit is placed against the open front of the cabinet, in such a way that little or no air can escape between the front of the cabinet and the load placed in the containers on the pallet. The forced air supplied via the intake is humidified by the means of the atomisation means, as a result of which the relative humidity of the air increases and the temperature of this air will fall as a result of the evaporation, and is then driven through the air-penetrable filter in order subsequently to flow over the fruit, via the outlet and via openings provided in the fruit containers. The high relative humidity and the lower temperature of this air have a beneficial effect on the length of time the fruit will keep. With this arrangement, the air-penetrable filter prevents atomised unvaporised liquid from coming into contact with the fruit. This could lead to rotting, and if the containers are in the form of cardboard boxes this could lead to softening of the cardboard.

The invention and advantageous embodiments thereof will now be explained in more detail below with reference to an illustrative embodiment shown in the drawing. In the drawing:

FIG. 1 shows a perspective view of a device according to the invention with a pallet stacked with boxes of bananas placed against it, and FIG. 2 shows a diagrammatic side view in cross-section of FIG. 1, in which the atomisation apparatus is turned the other way up.

The device for storing, in this example, bananas under controlled conditions comprises an essentially block-shaped cabinet 1 having a front 2, a top 3, a rear 4, two sides 5 and 6 and a base.

An air intake 7, comprising an inlet orifice 8, and a fan 9 are located in the top of the cabinet 1. A spray tube 11 is arranged in a chamber 10 located behind the intake 7. The chamber 10 is separated from the outlet by a splash board 12, for example in the form of a steel or plastic sheet, and an air-penetrable filter 13. Said filter 13 is preferably constructed of such fine mesh that it allows air and vaporised liquid to pass through but holds back condensate and moisture droplets.

In FIG. 2 it can be seen that a buffer beam 14, for the pallet 16, and a second buffer beam 15 are mounted at the bottom of the cabinet 1, on the front 2 thereof. The cabinet 1 is also provided with two guides 17, which project from the front 2. Said guides 17 ensure that the load on a pallet, which is placed against the cabinet by means of, for example, a fork-lift truck, is guided during this operation in such a way that that the side of the load on the pallet which faces towards the cabinet comes to rest as flush as possible against the front of the cabinet so that the closure between the periphery of the load on the pallet and the front 2 of the cabinet is optimum. Said closure can be improved by fitting sealing means on the front 2 of the cabinet around the periphery or the load on the pallet. Said sealing means can comprise, for example, strips 21 of a flexible material.

The dimensions of the outlet 18 formed in the front 2 of the cabinet essentially correspond to those of that side of the load of fruit, placed on a pallet, which is to be placed against the cabinet. That is to say, the outlet 18 is of such a shape that air can flow into the load via the entire surface of said side of the load. The outlet can thus, for example, be formed by an essentially rectangular opening having dimensions slightly smaller than those of said side of the load. However, it is also conceivable that the outlet is formed by a multiplicity of openings, for example by providing the front 2 of the cabinet with a multiplicity of perforations.

The device according to the invention functions as follows. A pallet 16 loaded with fruit is placed against the front 2 of the cabinet. Via the fan 9, air is drawn in through intake orifice 8 from the shed in which the device has been set up. Said air is fed over the spray tube 11, which is connected to a water source. Water is atomised into the air via the spray tube 11, as a result of which the humidity of the air increases and the temperature of the air falls as a consequence of evaporation. With this arrangement, the splash board 12 ensures that no water is sprayed directly into the outlet and also that no water comes into direct contact with the filter. The air having a higher humidity and a lower temperature passes via The filter 13 into a second chamber 19 and, as a consequence of the elevated pressure, will flow via the outlet 18 through the boxes 20 containing bananas. The air will then pass into the shed, which frequently is open to the surroundings.

Since fruit, such as bananas, is a living product, ripening thereof is followed immediately by the start of the decomposition process. As decomposes, the fruit generates heat, which further accelerates the decomposition process. This process is considerably retarded by removing this heat and cooling the Fruit to a lower temperature, with the result that the fruit keeps longer and is of a higher quality for a longer period, which is of decisive importance for the saleability of the fruit. Furthermore, as a result of the high relative humidity it becomes more difficult for the fruit to release moisture, which is likewise beneficial for the length of time the fruit will keep. Using the device according to the invention, the length of time for which the fruit will keep can be substantially extended in an advantageous manner. Indeed, the device according to the invention can be constructed to be very compact in the form of a flat box, is inexpensive to manufacture and can be used in an ordinary open storage area or warehouse. A pallet holding 48 boxes, each containing 18.8 kg of bananas, can easily be kept 2 to 3 days longer using the device according to the invention, the spraying of water having the effect of cooling the air by about 2° C. and it being easily possible for the relative humidity of the air to rise by 20%. In particular, relative humidities of greater than 90% are easily achievable, which is highly advantageous for the length of time the fruit will keep.

In FIG. 2, in contrast to FIG. 1, the atomisation means are so arranged that the direction of atomisation of the liquid is essentially counter to the direction of flow of the air flowing via the intake towards the atomisation means. In the case of the embodiment described here, this is achieved by directing the spray nozzles of the spray tube upwards, so that the liquid is essentially sprayed or sprinkled upwards, whilst the air supplied flows vertically downwards over the spray tube. The consequence of these measures is that the contact time between the atomised liquid and the air supplied increases. On the one hand, the relative humidity increases as a result of the longer contact time because more liquid is able to evaporate, and, on the other hand, the air supplied is cooled to a lower temperature as a result, because more liquid is able to evaporate and because the contact between the air and non-evaporating, relatively cold liquid droplets lasts longer. Preferably, the spray pressure and/or the positioning of the spray tube are such that no liquid can be sprayed into the outside atmosphere from the cabinet.

It will be clear that many variants of the present invention are conceivable. For instance, many means known per se for making fine droplets can be used for the atomisation means, for instance so-called vibrating baths, wherein fine droplets spring up from a liquid surface as the result of vibrations.

I claim:

1. A device for storing fruit in containers on a pallet, under controlled conditions, comprising a cabinet containing a chamber having an intake and an outlet for air, an atomizer for liquid within the cabinet, means for feeding liquid to the atomizer, said air outlet comprising a planar front of the cabinet, said air outlet having dimensions substantially those of the side of a load of fruit placed in containers on a pallet, and an air-permeable filter separating said chamber from the outlet.

2. A device as claimed in claim 1, air entering said intake flowing in one direction and said atomizer spraying liquid in an opposite direction into the air entering the intake.

3. A device according to claim 1, wherein the atomizer comprises a spray tube extending through the cabinet adjacent the air intake.

4. A device according to claim 3, and a splash board beside the spray tube for preventing the direct movement of liquid from the spray tube to the outlet.

5. A device according to claim 1, and a fan in said inlet for moving air into said chamber through said inlet.

6. A device according to claim 1, and sealing means at said outlet to seal about the periphery of a side of the load of containers on a pallet against the front of the cabinet.

7. A device according to claim 1, said air intake being an opening at the top of the cabinet, said atomizer comprising a spray tube in the upper part of the cabinet which is disposed horizontally and parallel to the front of the cabinet, and a splash board between the spray tube and the front of the cabinet.

8. A device according to claim 1, said filter being air permeable but liquid impermeable.

9. A device according to claim 1, there being a splash board between said atomizer and said outlet, said splash board comprising a vertical plate that terminates downwardly in said filter, said filter being vertical and said splash plate and filter being parallel to said outlet.

10. A device according to claim 1, and a buffer for a pallet disposed at the front of the bottom of the cabinet.

11. A device according to claim 1, and guides for receiving and guiding a pallet, said guides extending from the base of the cabinet.

12. A device according to claim 11, wherein said guides converge toward the cabinet.

* * * * *